Nov. 7, 1961   H. W. TEMPLETON   3,007,693
METERING VALVE
Filed June 25, 1958
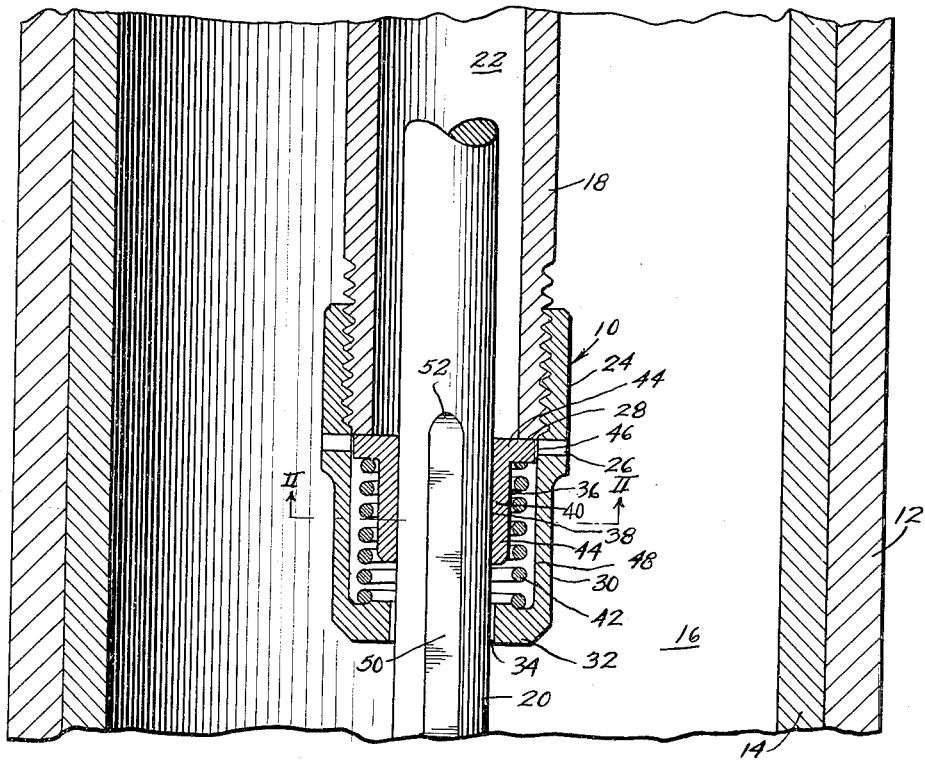
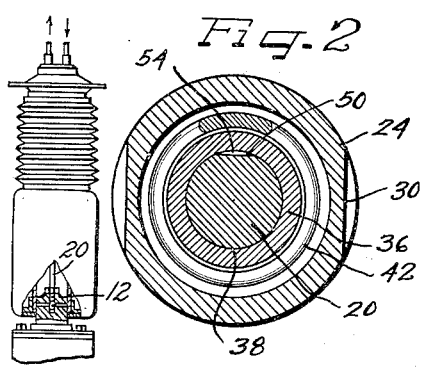
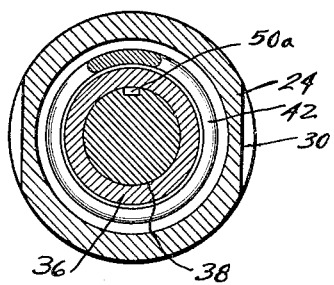
Inventor
Herbert W. Templeton
by Hill, Sherman, Meroni, Gross & Simpson Attys.

United States Patent Office 3,007,693
Patented Nov. 7, 1961

3,007,693
METERING VALVE
Herbert W. Templeton, Southfield, Mich., assignor to Thompson Ramo Wooldridge Inc., a corporation of Ohio
Filed June 25, 1958, Ser. No. 744,424
11 Claims. (Cl. 267—64)

This invention relates to a metering valve and pressure release valve for use in hydraulic leveling struts for vehicles and more particularly to a metering valve formed in combination with a pressure relief valve which is adapted to provide a shockproof flow system such as to prevent damage to a strut from forces produced by road bumps or the like.

In an hydraulic leveling system having a metering valve which includes a metering rod telescopically received in a metering tube communicating with a source of fluid supply, and, consequently, with other struts or the like, inward movement of the metering rod relative to the strut in response to sudden compression forces on the strut is apt to rupture the tube and strut where effective check valve means are provided for the inlet to the metering tube, or to effect damage to the entire system of struts in certain instances. Blow off valve means have been devised to prevent such damage, but have generally required a fairly extensive hydraulic circuitry, the blow off means being located at a distance from the metering rod valve, and in some cases have caused a pumping action by the metering valve.

The strut has generally been provided with a piston carrying the metering tube and adapted to be secured to a vehicle frame or the like, and a cylinder carrying the metering rod and adapted to be secured to the axle of a vehicle wheel or the like. The piston cooperates with the cylinder to define an expansible chamber whose volume determines the length of the strut, and suitable orifice means are provided to control flow of fluid from the chamber. The metering tube of the metering valve is supplied with fluid under pressure from a source such as a pump. Hydropneumatic spring means may also be provided in operative relationship to the fluid in the expansible chamber.

The present invention utilizes a metering valve for a leveling strut or the like, in combination with a pressure relief valve, a metering rod being secured to the cylinder of the strut and defining a metering surface in a preferred form of the invention, which extends longitudinally of the rod for a distance such that when the strut is in level ride position a portion of the surface is exposed above a bushing valve of the valve metering tube, to afford a steady feed-flow from the source of fluid supply. The metering surface may be a flattened surface, or a groove, and may also be provided with a predetermined taper along its length, so that when the strut is compressed in response to shocks from road bumps or the like the grooved portion will be exposed within the metering tube to a predetermined greater extent and more fluid will be permitted to flow from the metering tube into the expansible chamber defined by the strut cylinder and piston, so as to expand the strut and maintain a level ride condition. Rebound or extension movements of the vehicle suspension system bring the flattened, or grooved, portion of the metering rod into an axial position such that the metering rod diameter above the groove is disposed in the metering orifice and substantially all fluid flow is shut off to effect the return to the level length condition of the strut. Thus the vehicle frame will be maintained in a constant level position regardless of load changes imposed thereon.

In one form of the invention a bushing valve is slidably mounted in substantially close-fitting relationship with the metering rod and is biased by spring means into fluid-tight contact with the end of the metering tube, the spring means being received within a housing threadedly secured at the end of the metering tube. Alternatively, the valve bushing may be formed so that a certain amount of allowance between the bushing and the metering rod is afforded. In either case, when the metering rod is moved upwardly into the metering tube under shock conditions as described, the pressure on the fluid in the metering tube, which is substantially incompressible, is effective to move the bushing valve downwardly and to open blow-off orifices in the housing which are in communication with the expansible chamber in the strut cylinder, so as to afford relief of pressure in the metering tube, which might otherwise rupture or severely damage the metering tube and the strut.

It is, therefore, an object of the present invention to provide an improved liquid flow system for controlling the flow of a leveling liquid into a leveling strut in which any possibility of damage to the parts with sudden compressive blows on the strut is eliminated.

Another object of the invention is to provide an improved pressure relief mechanism, in combination with a metering valve for the control system, which is of simple construction and which operates in accordance with the condition of the metering valve to prevent pressure build-up within the valve and associated parts of the strut beyond a predetermined level.

Another object of the invention is to provide a pressure relief means, which includes a bushing valve adapted to open pressure relief orifices in a housing for the bushing valve, in response to a predetermined pressure condition in the metering valve.

Another object of the invention is to provide a metering valve and pressure relief valve as described in which a metering rod is reciprocably received within the bushing valve and cooperates therewith to afford controlled fluid flow from a metering tube of the valve or to prevent flow therefrom in accordance with the length of a strut or the like in which the valve may be mounted.

Another object of the invention is to provide an improved metering valve and pressure relief valve affording a highly efficient and effective flow control system which is simple in construction and inexpensive to manufacture and assemble.

Other objects and advantages of the invention will become apparent as the description proceeds in accordance with the drawings in which:

FIGURE 1 is a vertical sectional view taken through the axis of a metering valve and pressure relief valve structure for a vehicle support and leveling strut and embodying the present invention;

FIGURE 2 is horizontal sectional view taken through the lines II—II of FIGURE 1;

FIGURE 3 is a corresponding view of a second embodiment of the invention; and

FIGURE 4 is an elevational view, partly broken away, of the invention.

Referring now to FIGURE 1, a combination metering valve and pressure relief valve 10 is shown in accordance with the invention which is adapted for use in a leveling strut or the like having a cylinder 12 in which a piston 14 is slidably received, the piston and cylinder together defining an expansible chamber 16 for determining the length of the strut. The piston 14 of the strut may be connected to the frame of a vehicle at its upper end, while the cylinder 12 may be connected at its lower end to the axle of a vehicle, the strut being supplied with fluid under pressure from a source such as a pump. A similar strut may be used for each of the wheels of a vehicle in which the system is used. The valve means 10 of the invention includes a metering tube 18 in communication with the source of fluid supply at an upper end secured to the piston 14, as shown for example in the application of John P. Heiss, Serial No. 713,889, filed February 7, 1958, and now Patent No. 2,915,307, and a metering rod or valve core 20 disposed in telescopic coaxial relationship within the metering tube 18 and secured at its lower end to the cylinder of the strut, as understood by those skilled in the art. The expansion or contraction of the strut in response to loads imposed on the vehicle frame to which it is secured will thus be effective to reciprocate the metering rod 20 in the metering tube 18. Where sudden compression of the strut is produced as a result of road bumps or the like, the substantially incompressible fluid in the chamber 22 of the tube 18 would thus be under extreme pressure from the rod 20 such as might damage the struts of the suspension system, and where check valve means are provided in the inlet of the strut, the tube 18 and associated parts would be subject to rupture and other damage.

In order to prevent such damage, a housing 24 is threadedly secured to the lower portion of the metering tube 18, which defines a plurality of blow-off orifices 26 extending radially therearound at a position intermediate the ends of the housing such that, preferably, they open immediately below the lower end 28 of the metering tube 18 when the housing is secured on the metering tube by means of the flat surfaces 30.

The lower end of the housing 24 is formed with an inwardly turned annular flange 32 which defines an opening 34 receiving the metering rod 20 therethrough with a substantial clearance therebetween, and, in accordance with the invention, a bushing valve 36 is disposed on the metering rod 20 in preferably sealing relationship thereto. The metering rod 20 is adapted to reciprocate within the bore 38 of a cylindrical sleeve 40 of the bushing, and the bushing is maintained in normally fluid-tight relationship with the end 28 of the metering tube 18 by means of a helical spring 42, which bears against an annular flange 44 of the bushing at its upper end and against the flange 32 of the housing 24 at its lower end. Desirably, the peripheral vertical edge 46 of the flange 44 affords some clearance relative to the inner wall 48 of the housing 24, and the valve bushing can thus float laterally on the valve seat provided by the end 28 of the metering tube 18. This structure therefore permits a much closer fit between the bushing 36 and the metering rod 20 than is possible with fixed metering bushings, in which concentricity is a factor limiting the closeness of fit. It will, however, be appreciated that a construction affording slight clearance between the valve bushing and the metering rod would still permit operation of the system.

In order to provide a constant level length of the strut in which the metering valve and pressure relief valve of the invention is used, the metering rod 20 defines an axially extending metering surface or flattened portion 50, which defines a chord with the cylindrical rod 20, as seen in FIGURES 1 and 2, although other surfaces, such as the groove 50a, may be used within the scope of the invention as seen in FIGURE 3. The length of the metering surface 50 is such that, when no unusual loads are imposed on the vehicle frame and the strut is at its desired elevation, or level ride condition, a terminal portion 52 of the metering surface will extend above the bushing 36 and the metering surface will cooperate with the bushing to define a flow orifice 54. Thus a feed-flow of fluid from the relatively high pressure chamber 22 in the metering tube 18 to the operating pressure in the expansible chamber 16 will be afforded such as to compensate for fluid escaping from the chamber 16 through a flow-control orifice (not shown), and because of the close fit between the bushing 36 and the metering rod 20, the rate of feed-flow may be accurately calibrated in accordance with a desired level length for the strut. When the strut is compressed by bumps or the like, the rod 20 will move upwardly to an extent such as to afford a greater flow through the orifice 54, and effect expansion of the chamber 16 such as to return the strut to its level length condition. However, extension of the strut during rebound movements of the vehicle suspension system will serve to bring the portion of the metering rod above the end surface 52 into the bushing, and the closer fit afforded by the invention will cut off substantially all flow to the chamber 16 to permit a quick return, relatively, to the level length condition of the strut.

As the strut comes out of rebound, down towards the trim or neutral position, the rod 20 is forced into the chamber 22 which is supplied, as stated, with substantially incompressible fluid under a pressure head. Thus an extremely high fluid pressure may be generated which could damage the strut greatly. When such pressure has reached a predetermined value, however, the spring 42 will be compressed by the force against the flange 44 from the fluid in the chamber 22, so as to open the orifices 26 and permit blow-off through the valve seat 28 and the orifices into the chamber 16.

There has thus been provided a combination metering valve and relief valve of extremely simple and efficient construction, and requiring no hydraulic circuitry or the like and affording more accurate metering control and quicker return to the level length condition than heretofore available. The pressure relief valve operates in accordance with the position of the metering valve to prevent time lag such as could lead to excessive pressures before blow-off, and the blow-off point may be calibrated readily in accordance with the dimensions of the housing and its axial position on the metering tube, which may be adjusted if desired. The valve structure of the invention is simple to maintain and to manufacture, and is adapted to provide highly reliable long lasting service without breakdown or wear.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a vehicle leveling strut having a piston and a cylinder defining an expansible chamber, a metering valve and pressure relief valve comprising a metering tube secured to said piston and disposed in coaxial relationship therewith, means for introducing fluid under pressure into said metering tube for supplying said expansible chamber to determine the length of said strut, a metering rod secured to said cylinder and disposed in coaxial relationship therewithin, a housing means on the free end of said metering tube defining an opening for receiving said metering rod therethrough and a pressure relief orifice therein opening to said expansible chamber, a valve bushing in said housing slidably receiving said metering rod therethrough, and means urging said valve bushing into fluid-tight engagement with the free end of said metering tube, said metering rod cooperating with said valve bushing to afford a predetermined rate of flow from said metering tube to said expansible chamber sufficient to maintain a level length for said strut and to close off flow from said metering tube in a relatively extended position of said strut, said bushing having a flange extending radially inwardly of said tube and said means urging said bushing flange into fluid-tight relationship with said free end of said metering tube permitting movement of said valve bushing away from said end of said valve tube in response to fluid force against said flange to afford flow through said orifice in said housing into said expansible chamber when the pressure in said metering tube is at a predetermined level produced by movement of said metering rod into said metering tube.

2. In a leveling strut for a vehicle suspension system or the like, a combination metering valve and pressure relief valve comprising a metering tube, means for introducing fluid under pressure into said tube, a metering rod telescopically and reciprocably received in said metering tube, said metering tube and said metering rod being secured to opposite ends of said strut, a valve bushing slidably receiving said metering rod, and means urging said valve bushing into fluid-tight relation to said metering tube at the free end thereof, said metering rod being configured to define a flow orifice with said valve bushing when positioned for a predetermined length thereof in said metering tube and to prevent fluid flow through said bushing when moved outwardly from said metering tube a predetermined extent, said valve bushing having a flange extending radially inwardly from said metering tube, said means urging said valve bushing flange into fluid-tight relationship with said metering tube permitting movement of said valve bushing away from said metering tube in response to a predetermined fluid pressure in said metering tube acting against said flange whereby to afford pressure relief in accordance with the position of said metering rod in said metering tube.

3. In a leveling strut for use in a vehicle suspension system or the like having a cylinder and a piston defining an expansible chamber for determining the length of the strut and a flow limiting outlet for the chamber, a metering valve including a metering tube secured to said piston, means for introducing fluid into said metering tube to afford selective introduction of said fluid into said expansible chamber, a metering rod secured to said cylinder and extending into said metering tube in reciprocable telescopic relationship therewith, and defining a metering surface extending axially for a predetermined length thereof, a valve seat defined by the free end of said metering tube, a housing secured in coaxial relationship on the lower end of said metering tube and defining an internal cylindrical wall of greater diameter than the internal diameter of said metering tube, said housing defining a blow-off orifice in proximate axial relationship beneath said valve seat, and having a bottom wall defining an orifice receiving said metering rod therethrough with a predetermined amount of clearance, a bushing valve slidably receiving said metering rod in close-fitting relationship thereto, an annular flange on said valve bushing at the upper end thereof providing a valve for said valve seat and having a diameter less than the diameter of said internal wall of said housing to afford a relatively free floating disposition of said valve bushing relative to said valve seat and extending radially inwardly from said valve seat to provide a pressure surface and spring means bearing against said annular flange and against said bottom wall of said housing and adapted to urge said valve bushing flange into fluid-tight engagement with said valve seat, said metering surface being adapted to afford a predetermined leak-down flow through said valve bushing when said strut is at a predetermined level length and a further flow when said strut is contracted relative to said level length, said metering rod being adapted to close said valve bushing to flow from said metering tube when said strut is in a predetermined extended condition, said spring means being adapted to permit fluid flow past said valve provided by said bushing valve and said valve seat when the pressure on said bushing valve flange is at a predetermined level whereby to permit pressure relieving flow through said blow-off orifice to said expansible chamber and to maintain said metering tube and strut against injury.

4. In a leveling strut for use in a vehicle suspension system or the like having a cylinder and a piston defining an expansible chamber for determining the length of the strut and a flow limiting outlet for the chamber, a metering valve including a metering tube secured to said piston, means for introducing fluid into said metering tube to afford introduction of said fluid into said expansible chamber, a metering rod secured to said cylinder and extending into said metering tube in reciprocable telescopic relationship therewith, and defining a metering surface extending axially for a predetermined length thereof, a valve seat defined by the free end of said metering tube, a housing secured in coaxial relationship on the lower end of said metering tube and defining an internal cylindrical wall of greater diameter than the internal diameter of said metering tube, said housing defining a blow off orifice and having a bottom wall defining an orifice receiving said metering rod therethrough with a predetermined amount of clearance, a bushing valve slidably receiving said metering rod in close-fitting relationship thereto, an annular flange on said valve bushing at the upper end thereof providing a valve for said valve seat and having a diameter less than the diameter of said internal wall of said housing to afford a relatively free floating disposition of said valve bushing relative to said valve seat and extending radially inwardly from said valve seat to provide a pressure surface in said tube and spring means bearing against said annular flange and against said bottom wall of said housing and adapted to urge said valve bushing flange into fluid-tight engagement with said valve seat, said metering surface being adapted to afford a predetermined leakdown flow through said valve bushing when said strut is at a predetermined level length and a further flow when said strut is contracted relative to said level-length, said metering rod being adapted to close said valve bushing to flow from said metering tube when said strut is in a predetermined extended condition, said blow off orifice being located immediately below said valve seat and in radial registration with said annular flange, said flange having a peripheral valve normally closing said blow off orifice, said spring means being adapted to afford downward movement of said bushing valve relative to said valve seat when the pressure on said bushing valve flange pressure surface is at a predetermined level whereby to permit pressure relieving flow through said blow off orifice to said expansible chamber and to maintain said metering tube and strut against injury.

5. A combination metering valve and pressure relief valve for use in a leveling strut for a vehicle suspension system or the like comprising a metering tube, means for introducing fluid into said metering tube, a metering rod telescopically reciprocable in said metering tube, a metering surface defined by said metering tube and extending axially therealong for a predetermined length thereof, a valve bushing slidably receiving said metering rod therethrough and cooperating with an end of said metering tube to define a pressure relief valve and means urging said valve bushing into fluid-tight engagement with said end of said metering tube, said metering surface cooperating with said valve bushing to define a flow orifice affording a predetermined rate of leak-down flow from said metering tube in a predetermined level length condition of said strut and a further extent of flow in a more contracted condition of said strut, said metering surface being dimensioned to be disposed below the upper end of said valve bushing when said strut is in a predetermined extended position, said metering rod and said valve bushing having a complementary configuration such as to prevent fluid flow from said metering tube through said valve bushing when said strut is in said predetermined extended position, said valve bushing having a pressure surface extending radially into said metering tube, said means urging said valve bushing surface into fluid-tight engagement with said metering rod being adapted to permit said valve bushing to move axially on said metering rod away from said end of said metering tube when a predetermined pressure level is present in said metering tube to exert force against said pressure surface.

6. A combination metering valve and pressure relief valve for use in a leveling strut for a vehicle suspension system or the like comprising a metering tube, means for introducing fluid into said metering tube, a cylindrical metering rod telescopically reciprocable in said metering tube, a metering flat defining a chord with said metering rod defined by said metering tube and extending axially therealong for a predetermined length thereof, a valve bushing slidably receiving said metering rod therethrough and cooperating with an end of said metering tube to define a pressure relief valve and means urging said valve bushing into fluid-tight engagement with said end of said metering tube, said metering flat cooperating with said valve bushing to define a flow orifice affording a predetermined rate of leak-down flow from said metering tube in a predetermined level length condition of said strut and a further extent of flow in a more contracted condition of said strut, said metering flat being dimensioned to be disposed below the upper end of said valve bushing when said strut is in a predetermined extended position, said metering rod and said valve bushing having a complementary configuration such as to prevent fluid flow from said metering tube through said valve bushing when said strut is in said predetermined extended position, said valve bushing having a pressure surface extending radially into said metering tube and said means urging said valve bushing surface into fluid-tight engagement with said metering tube being adapted to permit said valve bushing to move axially on said metering rod away from said end of said metering tube when a predetermined pressure in said metering tube is exerted against said pressure surface.

7. A combination metering valve and pressure relief valve for use in a leveling strut for a vehicle suspension system or the like comprising a metering tube, means for introducing fluid into said metering tube, a metering rod telescopically reciprocable in said metering tube and extending groove defined by said metering tube and extending axially therealong for a predetermined length thereof, a valve bushing slidably receiving said metering rod therethrough and cooperating with an end of said metering tube to define a pressure relief valve with a pressure surface extending radially into said metering tube and means urging said valve bushing surface into fluid-tight engagement with said end of said metering tube, said metering groove cooperating with said valve bushing to define a flow orifice affording a predetermined rate of leak-down flow from said metering tube in a predetermined level length condition of said strut and a further extent of flow in a more contracted condition of said strut, said metering groove being dimensioned to be disposed below the upper end of said valve bushing when said strut is in a predetermined extended position, said metering rod and said valve bushing having a complementary configuration such as to prevent fluid flow from said metering tube through said valve bushing when said strut is in said predetermined extended position, said means urging said valve bushing into fluid-tight engagement with said metering rod being adapted to permit said valve bushing to move axially on said metering rod away from said end of said metering tube when a predetermined pressure in said metering tube is acting against said pressure surface.

8. A leveling strut having a pair of telescoping cylinders having closed outer ends and open inner ends and defining an expansible continuous chamber between said ends with fluid bleed means for bleeding fluid therefrom, flow control means for urging said leveling strut to a predetermined length comprising a metering tube connected to the closed end of one of said cylinders, means for introducing fluid under pressure into said metering tube, a metering rod connected to the closed end of the other of said cylinders and extending into said metering tube, said metering tube having an inner end defining a valve seat, a valve bushing slidably receiving said metering rod in snug fitting relationship, means urging said valve bushing into sealing engagement with said valve seat and a flow control surface on said metering rod coacting with said valve bushing to release fluid from said metering tube into said expansible chamber when said metering rod is extended into said metering tube to a predetermined extent, to replenish the supply of fluid in said expansible chamber and maintain a desired length of said chamber, said flow control surface terminating at a predetermined position axially on said metering rod in the direction of said metering tube, and said metering rod fitting in sealing relationship in said valve bushing above said terminal position of said flow control surface to prevent flow from said metering tube when said metering rod is moved outwardly from said metering tube to a predetermined extent, said valve bushing having a pressure surface extending radially into said metering tube and said means urging said valve bushing surface into sealing relation with said valve seat and permitting said valve bushing to move away from said valve seat and release a relatively large amount of fluid from said metering tube into said expansible chamber in response to predetermined thrust of said metering rod into said metering tube and consequent pressure against said pressure surface.

9. A leveling strut having a pair of telescoping cylinders having closed outer ends and open inner ends and defining an expansible continuous chamber between said closed ends with fluid bleed means for bleeding fluid therefrom, flow control means for urging said leveling strut to a predetermined length comprising a metering tube connected to the closed end of one of said cylinders, means for introducing fluid under pressure from outside said cylinders into said metering tube, a metering rod connected to the closed end of the other of said cylinders and extending into said metering tube, said metering tube having an inner end defining a valve seat, a valve bushing slidably receiving said metering rod in snug fitting relationship and having a pressure surface extending radially into said metering tube, means urging said valve bushing surface into sealing engagement with said valve seat, a housing secured to said metering tube and extending below said valve seat in closely surrounding relationship to said metering rod, an orifice in said housing and extending radially thereinto below said valve seat, and a peripheral valve surface on said valve bushing closing said orifice when said valve bushing surface is in sealing engagement with said valve seat and opening said orifice when said valve bushing surface is urged away from said valve seat.

10. In a vehicle leveling strut having a pair of telescoping cylinders with closed outer end and open inner ends and forming an expansible chamber, a metering tube connected to the closed end of one of said cylinders, means for introducing fluid under pressure into said metering tube from outside said cylinders, fluid outlet means for said chamber, a metering rod connected to an end of the other of said cylinders and extending reciprocably into said metering tube, a valve bushing relatively slidably surrounding said metering rod, and means urging said valve bushing into sealing relationship with the end of said metering tube opposite the end connected to said one of said cylinders, said valve bushing having a pressure surface extending radially inwardly of said metering tube to force said valve bushing away from said metering tube in response to predetermined pressure afforded by movement of said metering rod into said metering tube.

11. In a vehicle leveling strut having a pair of telescoping cylinders with closed outer ends and open inner ends and forming an expansible chamber, a metering tube connected to the closed end of one of said cylinders, means for introducing fluid under pressure into said metering tube from outside said cylinders, fluid outlet means for said chamber, a metering rod connected to an end of the other of said cylinders and extending reciprocably into said metering tube, a valve bushing relatively slidably surrounding said metering rod, means urging said valve bushing into sealing relationship with the end of said metering tube opposite the end connected to said one of said cylinders, said valve bushing having a pressure surface extending radially inwardly of said metering tube to force said valve bushing away from said metering tube in response to predetermined pressure afforded by movement of said metering rod into said metering tube, and a housing secured to said opposite end of said metering tube defining a blow off orifice normally closed by said valve bushing and opened in response to movement of said valve bushing surface away from said metering tube.

References Cited in the file of this patent

UNITED STATES PATENTS

| | | |
|---|---|---|
| 461,347 | Krone | Oct. 13, 1891 |
| 462,970 | Krone | Nov. 10, 1891 |
| 2,155,605 | Levy | Apr. 25, 1939 |
| 2,196,089 | Wallace | Apr. 2, 1940 |
| 2,915,307 | Heiss | Dec. 1, 1959 |

FOREIGN PATENTS

| | | |
|---|---|---|
| 995,585 | France | Aug. 22, 1951 |